United States Patent [19]

Hirai

[11] Patent Number: 4,881,021
[45] Date of Patent: Nov. 14, 1989

[54] NUMERICAL CONTROL EQUIPMENT

[75] Inventor: Hayao Hirai, Aichi, Japan

[73] Assignee: Mitsubishi Denki Kabushiki Kaisha, Tokyo, Japan

[21] Appl. No.: 112,002

[22] Filed: Oct. 23, 1987

Related U.S. Application Data

[63] Continuation-in-part of Ser. No. 41,375, Apr. 22, 1987, abandoned.

[30] Foreign Application Priority Data

Apr. 22, 1986 [JP] Japan .................................. 61-91197

[51] Int. Cl.⁴ ............................................ G05B 19/18
[52] U.S. Cl. .................................... 318/569; 318/570; 364/474.28
[58] Field of Search ............... 318/569, 570, 571, 572; 364/474, 474.28

[56] References Cited

U.S. PATENT DOCUMENTS

| | | | |
|---|---|---|---|
| 3,135,055 | 6/1964 | Butler et al. | 33/174 |
| 3,250,012 | 5/1966 | Hilton et al. | 33/174 |
| 3,605,531 | 9/1971 | Izumi et al. | 318/572 X |
| 3,605,909 | 9/1971 | Lemelson | 173/3 |
| 4,287,558 | 9/1981 | Nishitani | 364/200 |
| 4,561,058 | 12/1985 | McMurty | 318/572 X |
| 4,562,392 | 12/1985 | Davis et al. | 318/632 X |
| 4,590,580 | 5/1986 | Takezawa et al. | 318/522 X |
| 4,713,593 | 12/1987 | Rodi et al. | 318/572 |

FOREIGN PATENT DOCUMENTS

| | | |
|---|---|---|
| 0199961 | 3/1986 | European Pat. Off. . |
| 0242869 | 4/1987 | European Pat. Off. . |
| 2548402 | 1/1985 | France . |
| 33-160016 | 5/1958 | Japan . |
| 35-201005 | 7/1960 | Japan . |
| 1211418 | 11/1968 | United Kingdom . |
| 2174216 | 10/1986 | United Kingdom . |

OTHER PUBLICATIONS

Proceedings of the Numerical Control Society Annual Meeting & Technical Conf., Hartford, Apr. 27-30, 1980, pp. 329-341, C. Lazzaretti: "Computer Aided Inspection System".

Primary Examiner—Benjamin Dobeck
Attorney, Agent, or Firm—Sughrue, Mion, Zinn, Macpeak & Seas

[57] ABSTRACT

A numerical control equipment comprises a control section for applying to a drive motor for driving a table on which an object under measurement is placed a movement instruction for moving said object to a theoretical position, a position register for receiving a detection signal outputted by a position sensor adapted to detect the position of the table, a memory unit for storing instruction data separately according to functions and uses, and a measuring head for measuring the difference between the stop position of the object and a reference position simultaneously with positioning of the object to the theoretical position, wherein said control unit operates a measurement value provided by the measuring head and a register value of the position register and rewrites the contents of addresses provided separately according to functions and uses in the memory unit with an operated value as a measurement result.

14 Claims, 3 Drawing Sheets

NUMERICAL CONTROL EQUIPMENT

This is a continuation-in-part of application Ser. No. 041,375 filed 4-22-87 now abandoned.

BACKGROUND OF THE INVENTION

This invention relates to numerical control equipment for a machine tool with measuring devices such as a tool measuring device, tool presetting device, workpiece measuring device, three-dimensional measuring device and digitizer, and more particularly to numerical control equipment which performs accurate measurement with a measuring head, on the principle of electrical micromeasurement.

Development of numerical control equipment depends greatly on automatic operation of machine tools or other industrial machines. The automatic operation is improved by the automation of a stage changing operation, a setting operation, a workpiece dimension measuring operation, and an error correcting operation. In this connection, a tool measuring operation, a tool presetting operation and a workpiece measuring operation have been automated earlier. The tool measuring operation and the work measuring operation are employed for automation of the workpiece dimension measuring operation and the error correction operation. The tool presetting operation is employed for automation of the setting operation.

The term "tool measuring operation or tool measurement" as used herein is intended to mean the operation in which the preset position of an edge of a tool and the actual position thereof are subjected to comparison measurement. For instance in a machining system, with respect to a preset value for the length of protrusion of a tool with respect to the machine origin of an end mill edge as a reference position, variation including the edge wear caused by the machining operation with the tool and the thermal displacement of the mechanical system is measured at the edge. The difference between the variation thus measured and the preset value is obtained so as to rewrite the tool wear correcting data of the numerical control equipment.

Therefore, if the tool wear correcting data (in the case of the end mill, tool diameter correction in a radial direction X, and tool length correction in a lengthwise direction Z), is used, then the following workpiece can be machined by the end mill to initially set dimensions or configuration with the X-axis and Z-axis correction.

The term "tool presetting operation" as used herein is intended to mean the operation in which a machine reference position is made to coincide with a tool position in a tool chamber or the like, the length of protrusion of the tool from the reference position to the edge is obtained in X-Z coordinates with a tool microscope or the like, and is written as tool preset data for the numerical control equipment, or it is measured with a measuring device for the tool preset on the machine tool so as to be automatically written in memory.

For instance in a machining system, the distance between the edge of a tool connected to a machine to a machine origin is measured in the X-Y-Z coordinates in such a manner that the tool is secured to the spindle head and the edge of the tool is held in contact with the measuring device, so that it is automatically written as tool presetting data for the numerical control equipment. Therefore, even if a machining program is formed with tools different in the X-Y-Z coordinates of the edges regarded as if they were equal in length, correction is automatically effected by using the preset data for every tool selected for a machining operation. Accordingly, even when the tool length (Z) or the tool diameter (X or Y) changes, the workpiece can be finished to desired dimension with the same program.

The term "workpiece measuring operation" as used herein is intended to mean the operation in which the dimensions of a machined workpiece are measured in the X-Y-Z coordinates, and, when necessary, errors in dimension and in configuration are calculated.

In order to eliminate the deviation of the dimensions or configuration of the machined workpiece from those set initially because of the errors caused by the tool wear and/or the thermal displacement of the mechanical system, measurement is carried out for every machining operation or several machining operations to obtain the difference between the measured values and the initially set values, so that for instance the tool wear correcting data and the tool diameter correcting data are updated. Accordingly, before the following workpiece is machined, the correction is carried out so that workpiece is machined exactly to the initially set dimensions or configuration. The measured values and the errors in dimension or configuration may be printed out for preparation of a workpiece inspection result.

The workpiece measuring operation is necessary for machining a workpiece to initially set dimensions or configuration. For this purpose, each machining point of a machined workpiece is measured in the X-Y-Z coordinates on the machining center, the differences between the measured values and initially set values are calculated so that a tool wear correcting value is determined to update the tool wear correcting data. For instance when the diameter of an inner circular hole formed with an end mill is smaller, the tool diameter correcting data inputted is reduced as much as the difference, and when the depth of the circular hole from the end face is smaller, then the tool length correcting data inputted is reduced as much at that difference.

Thus, the workpiece to be worked can be machined under the conditions where the errors in dimension or configuration involved in the preceding machining operation have been eliminated.

The tool measuring operation, the tool presetting operation and the work measuring operation are applicable to CNC lathes, CNC jig grinders, and CNC jig borers in the same manner.

FIG. 3 outlines the arrangement of a conventional numerical control equipment with a measuring device in which an X-axis of coordinate axis of a vertical type machining center is exemplified. Specifically, the equipment will be described with reference to the case where a workpiece measuring operation is given to a block-shaped object 8 on the machining center.

In FIG. 3, reference numeral 1 designates a numerical control equipment body which comprises a control unit 2, a memory unit 3, a position register 4, an input interface 5, and an output interface 6.

Reference numeral 7 designates a table on which the object 8 under measurement is placed. In the case where the object 8 is in the form of a block, the object 8 is fixedly secured to the table 7 with a clamp or the like in such a manner that it is in contact with a table reference block 7b.

Reference numeral 9 designates a threaded bar engaged with a threaded hole formed in a protrusion 7a extended downwardly from the table 7; 10, a drive motor for rotating the threaded bar 9 to move the table 7; 11, a rotary sensor coupled to the drive motor 10, the output of the sensor 11 being supplied to the position register 4; and 12, a linear sensor provided on the table 7. The linear sensor 12 can be used in place of the rotary sensor 11 when necessary.

Further in FIG. 3, reference numeral 13 designates a touch sensor mounted on the head of the machining center and fixed in position in the X-axis direction, the detection output of the touch sensor 13 being supplied through the input interface 5 to the control section 2; 14, a display unit connected to the output interface 6; and 15, a printer connected to the output interface 6.

The operation of the conventional numerical control equipment will be described with reference to the case where workpiece measurement is given to a block-shaped object.

The movement of the object to a theoretical position (or for a mathematical distance between a measuring point 100 and the original of a figure with the table reference block 7b as a reference, 50 mm in the case of FIG. 4) is controlled as follows: The control section 2 calculates the distance of 450 mm which is obtained by subtracting 50 mm from the distance 500 mm between origin 102 and the figure origin 104, and determines an instruction value according to the result of calculation. According to the instruction value thus determined, the motor 10 is driven to move the table 7 to the right in FIG. 4. While the table 7 is being moved, the output of the rotary sensor 11 is fed back to the position register 4. As a result, speed and position correcting instructions are supplied to the drive motor by the control section 2 until the moving speed and position meet the instruction values. That is, the object is moved to the theoretical position while the correction is repeatedly carried out so that the moving speed and position agree with the instruction value.

In the movement of the table 7, the rapid traverse speed (24 m/min in maximum at present) of the table 7 is decreased to an extremely low speed, for instance a measuring speed of 13.336 mm/min when the table reaches the position which is several millimeters (0.227 mm in this case) away from the theoretical position, thus providing a measuring gap, in order to ensure the accuracy of the workpiece measurement.

On the other hand, when the contactor 13a of the touch sensor 13 fixed in place touches the block-shaped object 8 under measurement, the touch sensor 13 outputs a contact pulse signal, which is applied through the input interface 5, as an interrupt signal, to the control unit 2.

The control unit 2 performes a variety of controls with interrupt signal intervals (time sharing system). Therefore, if the interrupt signal of workpiece measurement completion reaches the control unit 2 during an interrupt signal interval, it will not received until the end of the interrupt signal interval (2.2 msec). Therefore, the table 7, on which the block-shaped object 8 is placed, is moved on at a speed of 13.336 mm/min, and the content of the position register 4 is changed continuously. When the end of the interrupt signal interval occurs with the lapse of time, the interrupt signal from the touch sensor 13 is received, so that the counting operation of the position register 4 is suspended, and the movement of the table at the measuring speed is stopped.

The measurement value of the position resister 4 is applied, as a present position, to the control unit 2, so that the mutual relation between the present position and the theoretical position (command position/target position) 450 mm is operated to obtain a workpiece measurement value, which is applied through the output interface to the display unit 14 so as to be displayed, and is printed out with the printer when necessary.

The workpiece measurement value and errors are printed out when it is required to provide an inspection sheet with the errors displayed in the ranges of allowable values. In the case where it is necessary to machine the workpiece again with the errors out of the ranges of allowable values, the control unit 2 calculates a tool correction value according to the workpiece measurement errors so that the tool corrections stored in the memory unit 3 are automatically rewritten, and under this condition the machining of the workpiece is started again because a procedure of allowing the positional correction of the following workpiece with respect to the theoretical position has been accomplished. Thus, the configuration and dimensions of the object 8 can be placed in the ranges of allowable values.

Disadvantages of the above-described conventional equipment will be described by using numerical data. for instance when the interrupt signal interval is 2.2 msec and the measuring speed is 13.336 mm/min (or 0.227 mm/sec), the positional dispersion is 0.5 $\mu$m. When the measuring gap is 0.227 mm, then the measuring movement time is one second.

The workpiece measurement of the machining center has been described. However, also in the case of a tool presetting operation or tool edge measuring operation, or in the case of a CNC lathe, CNC jig grinder or CNC jig borer, the quick forwarding speed must be decreased to the extremely low speed for measurement.

The conventional numerical control equipment is designed as described above. Therefore, because of the relation between the interrupt signal interval and the moving speed, the precision cannot be maintained without employing the extremely low speed or decreasing the interrupt signal interval. However, the interrupt signal interval cannot be changed with ease, being substantially determined by the hardware employed. Accordingly, it is necessary to change the moving speed to the extremely low speed in the measurement. This means an increase in the measuring time, especially in a multi-point measurement.

The term "multi-point measurement" as used herein is intended to mean the following measurement: In the workpiece measurement of the object 8 in FIG. 3, the machined thickness 50 mm is measured at only one point; however, measurement of a plane at one point is low in reliability. In order to overcome this difficulty, a workpiece is measured at a number of points arranged in matrix form or at random, so that the average, upper and lower values of the measurement values are obtained, and the data are rewritten in the same manner single point measurement.

In the case of a free curved surface, the workpiece measurement may be achieved with the measuring point intervals being made constant. This measuring method is also called multi-point measurement.

SUMMARY OF THE INVENTION

An object of this invention is to eliminate the above-described difficulties accompanying a conventional numerical control equipment. More specifically, an object of the invention is to provide a numerical control equipment in which the measuring time is included in the positioning time, and the positional errors depend only on the accuracy and repeatablity of a measuring head employed.

In the numerical control equipment according to the invention, a measuring head is used as a positional dimension measuring means, and after an object under measurement has been positioned, the difference from the theoretical value (or theoretical position) is measured by allowing the contactor of the measuring head to touch the object, and the measurement result and the stop position of the object are subjected to arithmetic operation, to detect the absolute position and errors of the object.

In the numerical control equipment according to the invention, the difference from the theoretical position is calculated by using the measurement output of the measuring head, and the difference thus calculated and the stop position of the object are subjected to arithmetic operation, and with the result of the arithmetic operation as a measurement result, the contents of addresses provided separately according to functions are rewritten in memory units, so that the measurement is achieved at high speed and with high accuracy.

DETAILED DESCRIPTION OF THE INVENTION

Figure 3:
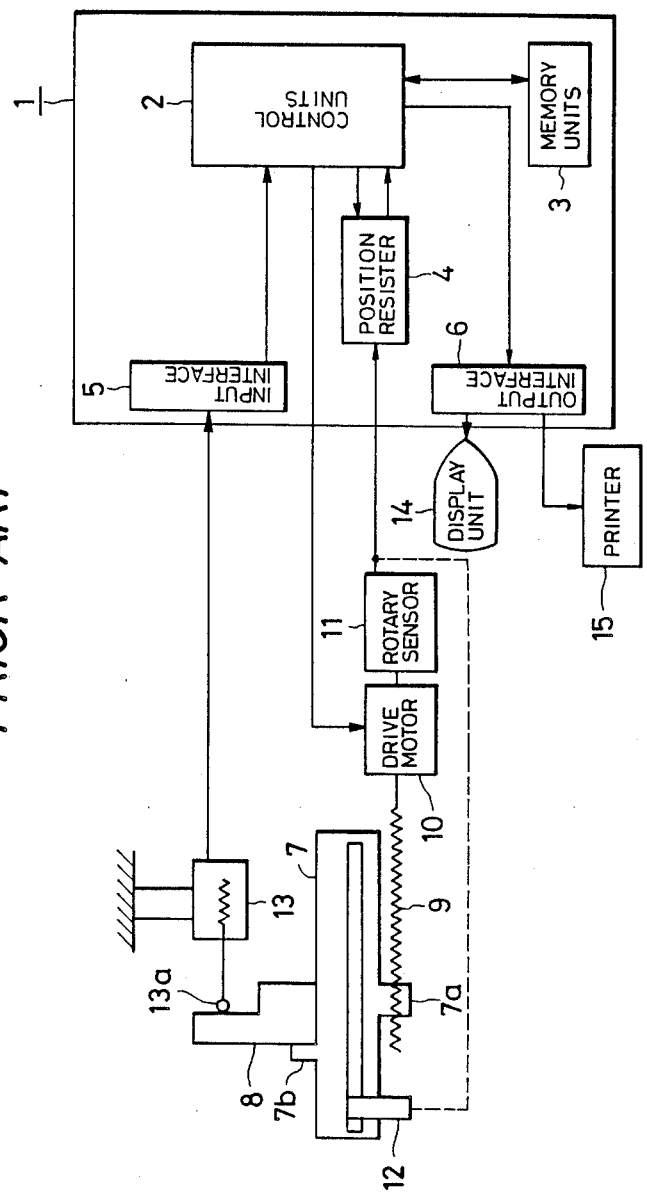
FIG. 3 is also an explanatory diagram, partly as a block diagram, showing an example of a conventional numerical control equipment.

A first embodiment of this invention will be described with reference to FIG. 1, in which those components which have been already described with reference to FIG. 3 are designated by the same reference numeral.

Figure 1:
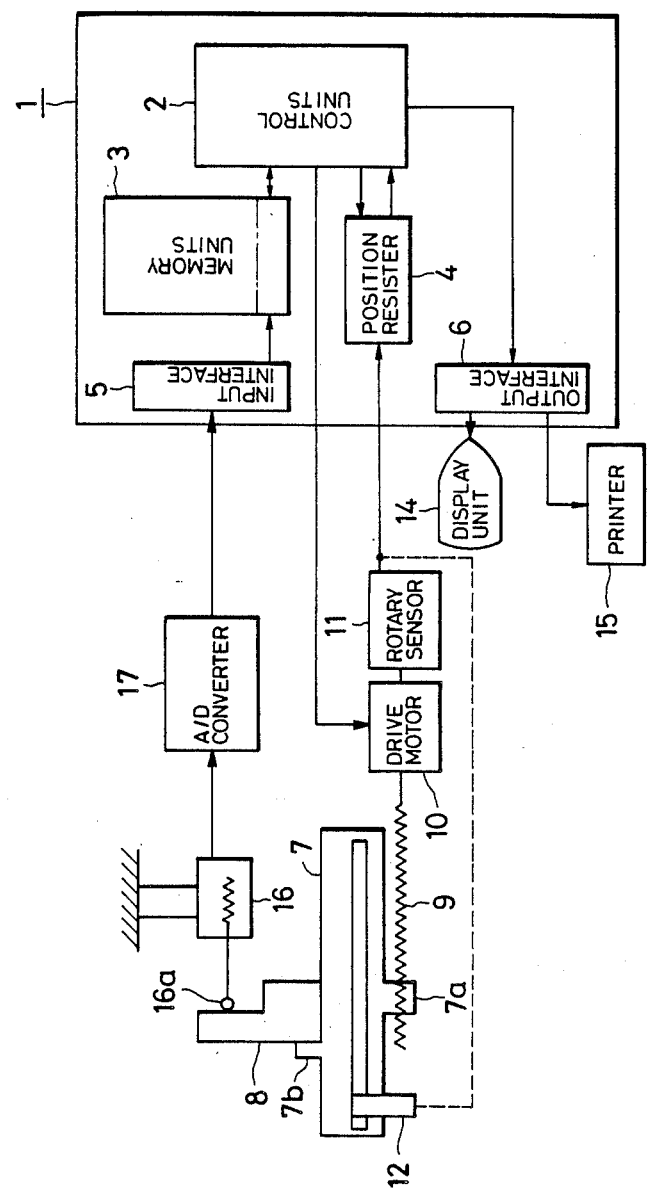
FIG. 1 is an explanatory diagram, partly as a block diagram, showing one example of a numerical control equipment according to this invention.

In FIG. 1, reference numeral 16 designates a measuring head operating on the principle of an electrical micro-measurement; and 17, an analog-to-digital converter for converting an analog output of the measuring head 16 into a digital signal (hereinafter referred to as "an A/D converter 17", when applicable). The memory unit 3 in the numerical control equipment body 1, unlike the memory unit in FIG. 3, is provided between the control unit 2 and the input interface 5. The measuring head 16 is a conventional one (cf. Japanese Patent Application Laid Open No. 7509/1983 for instance).

An analog voltage outputted by the measuring head 16 is converted into a binary digital value in units of 0.1 $\mu$m by the A/D converter 17. (A period of time of from 10 $\mu$sec to 20 $\mu$sec is required for analog-to-digital conversion; however, for an error of 0.1 $\mu$m, the period of time can be disregarded from the macroscopic view).

Figure 5:
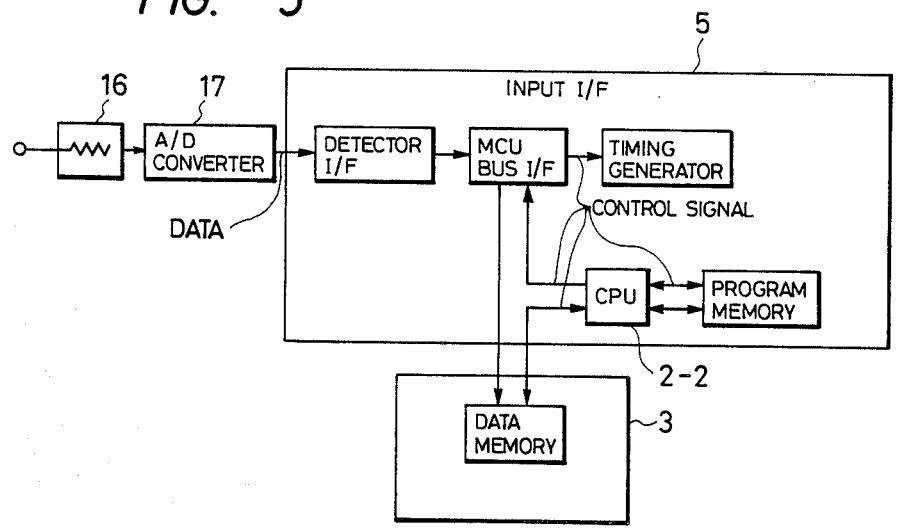
FIG. 5 is a block diagram showing the arrangement of an input interfance shown in FIG. 1 or 2.

Thus, the output of the measuring head is applied as a digital value to the input interface 5 at all times. In the input interface 5 (FIG. 5), the digital value is converted into a data format which independently of a main CPU, can be written in the memory unit 3 in response to an instruction from a CPU 2-2 in the input interface 5 so that refresh data from the A/D converter can be written. The memory device in the input interface is a dual port RAM.

Figure 6:
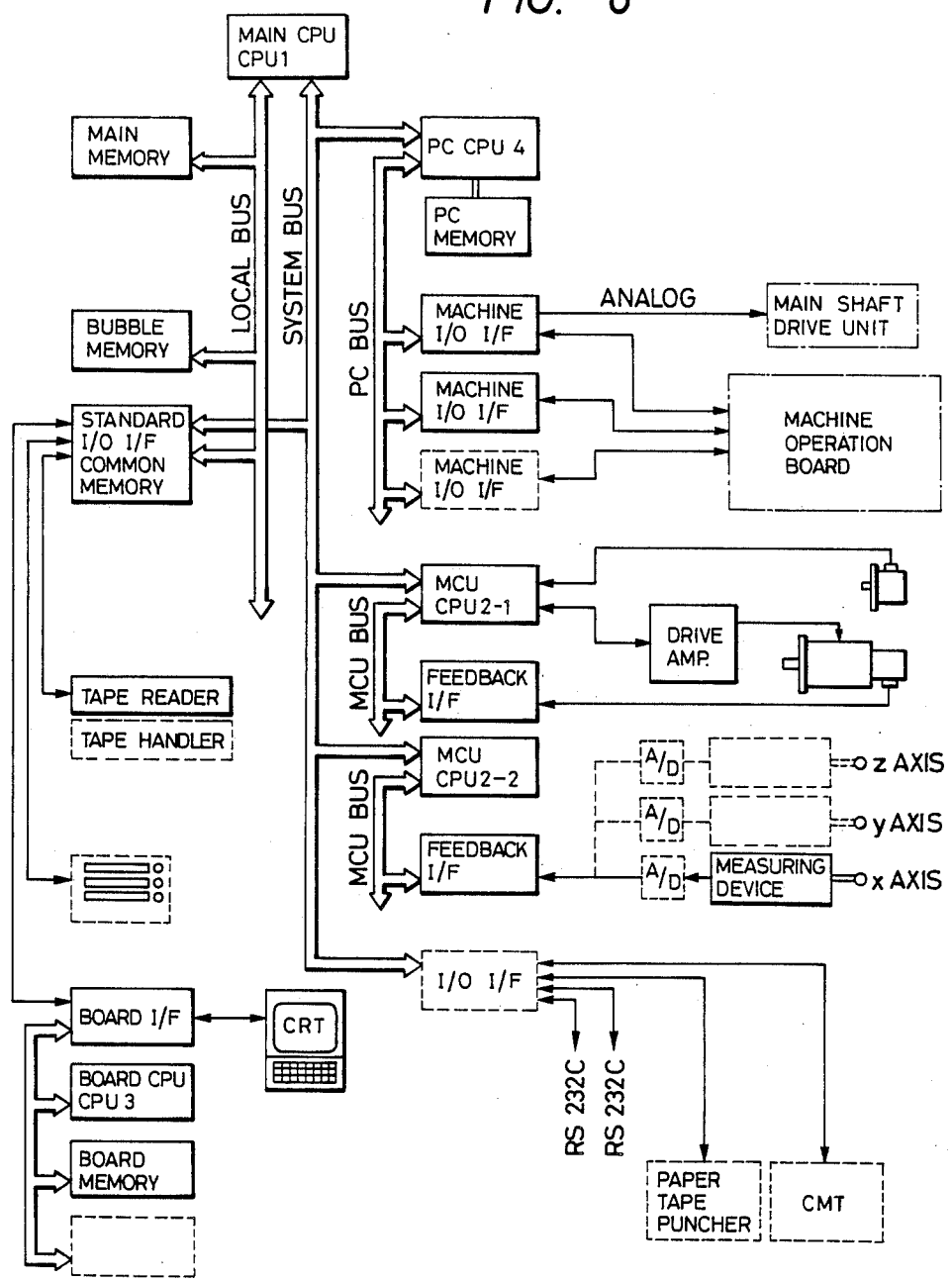
FIG. 6 is a block diagram showing the numerical control equipment of FIGS. 1 and 2 in more detail.

The memory unit 3 in FIG. 1 (or 2) is made up of memory modules, namely, a CPU 1 (CNC main control), a CPU 2 (MCU), a CPU 3 (PC) and a CPU 4 (CRT) arranged in a system bus region and in a local bus region as shown in FIG. 6. In the system bus region, the memory elements using data in common are dual port RAM.

The MCU region of the dual port RAM is used for feedback data from a servo system and measurement values provided by the measuring head.

The measurement value outputted by the measuring head is always written in accordance with the change of the measuring value by means of a write instructing unit (CPU 2-2 (MCU-2) in this embodiment) built in the input interface 5.

This part can be regarded as memory units operable as a reversible counter. The dual port RAM has two pairs of writing and reading ports. However, the dual port RAM is so controlled by means of software so that the two writing or reading ports may not be used simultaneously. In this embodiment, the measurement data are always written for the measuring head (MCP-2), and are always read for the CPU 1 (CNC main control).

In addition a method is available in which a reversible register is included in the memory unit, a process for writing the output of the measuring head is carried out at all times, and when necessary the register is clamped in response to an instruction from the CPU 1 so that the resultant data are transferred to another storage region so as to be used for data processing later. However, in this case, it is necessary to improve the hardware.

In the memory unit shown in FIG. 3, the writing and reading operation is carried out by means of the main CPU and sub CPU, and the data are sampled, written and read according to the interruption signals which occur at predetermined time intervals; that is, the data are not always refreshed.

For the above-described reason, the memory unit is arranged between the input interface and the CPU 1 (CNC main control) in order to write the input of the dual port RAM independently of control instructions from the CPU 1.

Figure 4:
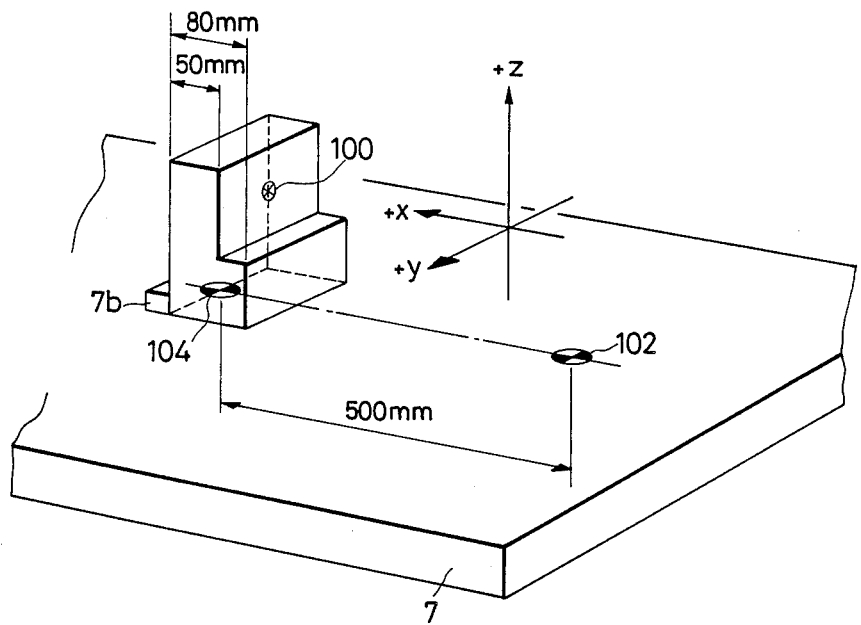
FIG. 4 is a perspective view showing an example of an object or workpiece under measurement in FIG. 1, 2 or 3.

Now, the operation of the numerical control equipment will be described with reference to the case where the machine tool is a machining center, and an object under measurement is a block-shaped object 8, and a dimension of 50 mm from the figure origin is measured on one side (FIG. 4).

First, the power switch of the CNC connected to the machine tool is turned on. After the operating preparation has been accomplished, the operator carries out a movable axes returning operation to return the movable axes to the origin. Thereupon, the initial value of the machine origin decoded by means of software in the main memory of the CPU 1 is automatically preset to an origin offset value, the reference position of the measuring head, by the CPU 1.

Upon completion of the machine origin presetting operation, the machine tool becomes operable in a selected operation mode.

Under this condition, the operator selects an automatic operation mode, calls a measuring program stored in a machining data area in the memory unit 3, and operates a cycle start button to start the machining center. As a result, the machining center starts its measuring operation according to the measuring program.

In this case, theoretical position data (500 mm minus 50 mm) of the measuring program are to move the block 8 to a position apart from the machine origin by 450 mm in the X-axis direction. The control unit 2 reads the theoretical position data. A drive instruction decoded by the software in the main memory of the CPU 1 is applied to drive module in the control unit and is subjected to arithmetic operation by means of a software in the MCU memory of the CPU (MCU-1). The drive instruction is converted by a drive amplifier (FIG. 6) into a rotational angle and an electric current corresponding to a speed of rotation, which are applied to the drive motor 10. As a result, the motor 10 is rotated, and accordingly the threaded bar 9 is rotated, so that the table 7 is moved to move the block 8 to the theoretical position 450 mm away from the machine origin. The position of the block thus moved is detected with the rotary sensor 11 or the linear sensor 12. The result of detection is fed back to the position register 4, where it is compared with the theoretical position. The error between the two positions is subjected to feedback in the drive module for the purpose of rotational angle conversion, so that the drive motor 10 is rotated again, and the output of the sensor is supplied to the position register 4, where it is compared with the theoretical position. The above-described operations are repeatedly carried out until the error between the position measured and the theoretical position becomes zero. That is, X-axis is held at the theoretical position which is 450 mm away from the machine origin, when the error is zero.

As the table 7 moves, the contactor 16a contacting the block 8 is moved. As a result, the measuring head 16 fixed at the reference position outputs an analog voltage according to the difference from the reference position. The analog voltage is converted into a binary digital value in units of 0.1 $\mu$m by the A/D converter 17. The binary digital value is supplied through the input interface 5 to the memory unit 3. In the memory unit 3, the binary digital value is written in a measured-position memory unit employing a dual port RAM in which data can be written at all times.

When, with the table 7 stopped at the theoretical position, the end of the interrupt signal interval occurs, according to the program stored in the main memory of the CPU 1, the measured position and the theoretical position, from the machine origin, of the block 8 are read out of the memory unit 3 and the position register 4, respectively, for calculation of the following equation:

(error) = (theoretical position) − ((present position) + (measured position))

For instance when the measured position is −0.010 mm,

+0.010 mm = 450.000 mm − (450.000 mm − 0.010 mm)

This error is stored in a temporary data area in the main memory 3. A figure dimension 50.010 mm, error +0.010 mm, present position 450.000 mm, theoretical position 450.000 mm, and measured value −0.010 mm are supplied through the output interface 6 to the display unit 14 so as to be displayed as measurement result thereon, and when necessary for inspection record, to the printer in response to an input instruction made by the operator.

These operations can be carried out by reading position and the content of the position register simultaneously whenever the interruption signal interval comes to the end from the time instant when the analog output starts to occur due to the movement of the contactor 16a held in contact with the block 8. This will become more apparent from a flow chart shown in FIG. 7.

Figure 7:
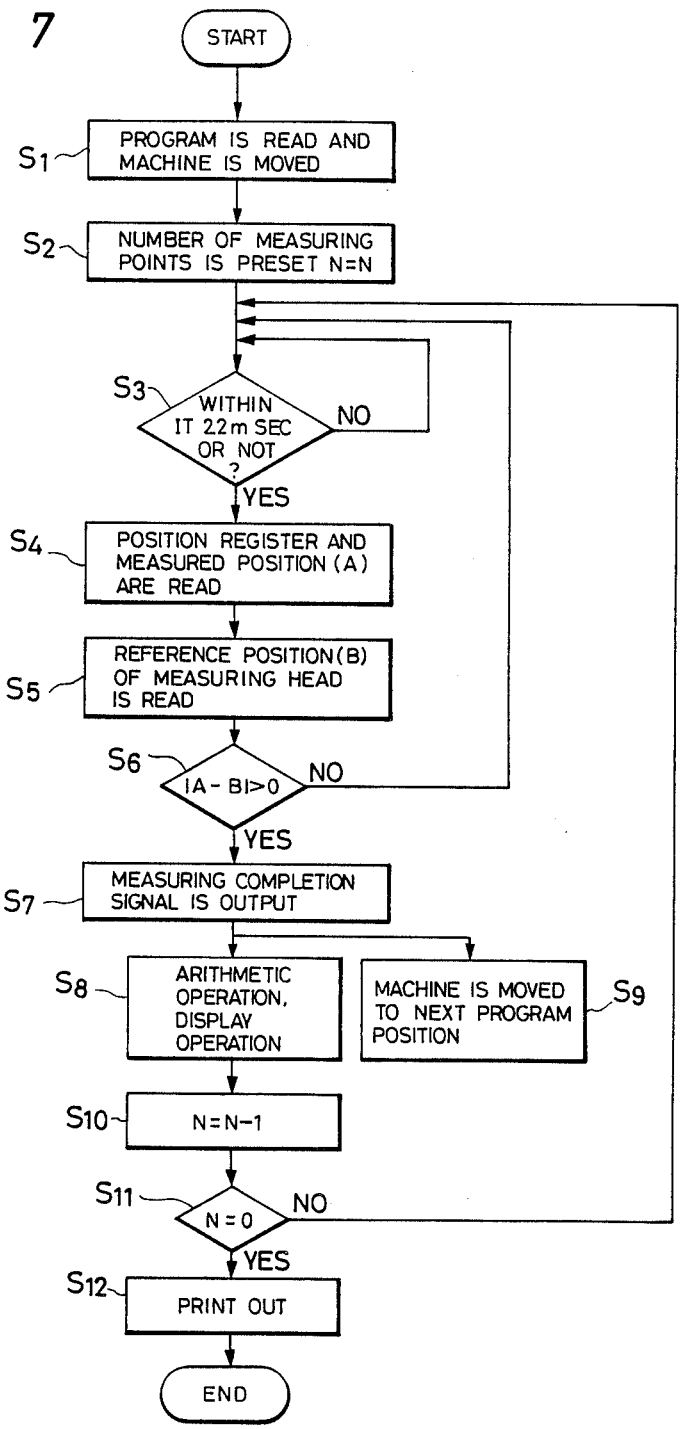
FIG. 7 is a flow chart for a description of a measuring operation with the numerical control equipment of the invention.

As shown in FIG. 7, in step $S_1$, the program is read to set the number of measuring points, and the machine is moved toward the first measuring point. In step $S_2$, the number of measured points is preset. In step $S_3$, it is determined whether or not the end of the position register interrupt signal interval (IT) of 2.2 msec occurs. In step $s_4$, the content of the position register and a measured position (A) are read simultaneously. In step $S_5$, the reference position (B) of the measuring head is read. In Step $S_6$, it is determined whether or not the contactor 16a contacts the block 8. In this connection, a method of using hardware to provide the contact signal may also be employed. In step $S_9$, the machine starts to move to a next program position. It is initially determined whether or not the data are printed out in step $S_{12}$.

When necessary operations have been achieved according to the flow chart of FIG. 7, the measurement can be carried out even before the movement of the table 7 is accomplished. In the case where the measurement stroke of the measuring device is of the order of 0.5 mm, then the theoretical measuring speed is:

227 mm/sec (because 0.5 mm/2.2 msec × 1000 msec/sec ≈ 227 mm/sec)

This permits a high speed measuring operation, and allows arithmetic operations during the next movement.

In the above-described embodiment, one point on the block is measured in the X-axis direction. This measuring operation can be developed into a variety of measuring operations as listed in the following Table:

TABLE

Figure 8A:
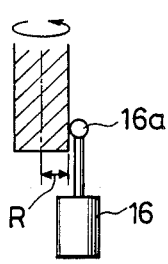
FIGS. 8(a) through 8(e) are explanatory diagrams showing applications of the measuring operation according to the invention.
Figure 8B:
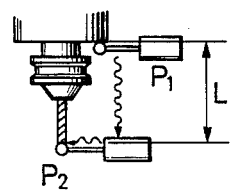
Figure 8C:
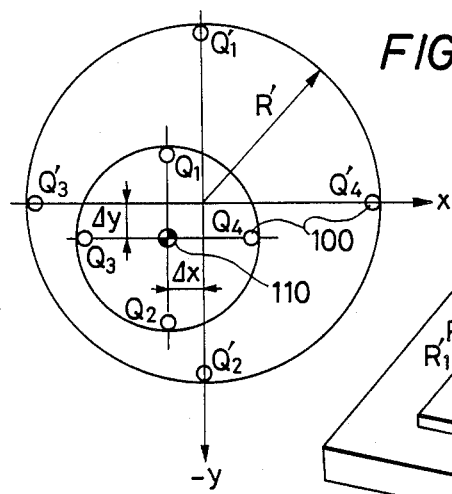
Figure 8D:
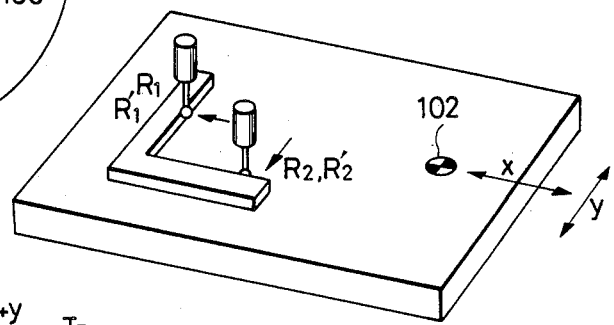
Figure 8E:
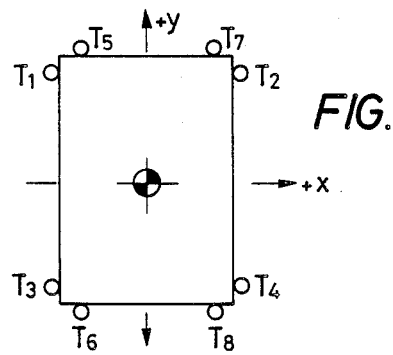

| No. | Measurement | Usage | Diagram |
|---|---|---|---|
| 1 | Tool diameter measurement<br>Tool length measurement | Tool presetting and tool correction | FIG. 8(a)<br>FIG. 8(b) |
| 2 | Machined configuration measurement | Program correction | FIG. 8(c) |
| 3 | Workpiece-mounting table reference surface measurement | Origin set Origin offset correction | FIG. 8(d) |
| 4 | Workpiece measurement | Workpiece centering | FIG. 8(e) |

FIG. 8(a) is a diagram showing a tool diameter measuring method. The measurement is carried out in the X-axis or Y-axis. In FIG. 8(a), the tool is turned in a direction opposite to the direction of its edges, to measure the radius R. The tool diameter is 2×R.

FIG. 8(b) is a diagram showing a tool length measuring method. The measurement is carried out in the Z-axis. As shown in FIG. 8(b), positions $P_1$ and $p_2$ are measured. The tool length (L) can be calculated according to the following equation:

$$L = P_2 - P_1$$

The position $p_1$ is generally preset. Therefore, it is unnecessary to measure the position $P_1$ for every tool length measurement.

FIG. 8(c) is a diagram for a description of a machined configuration measuring method. The measurement is performed in the X-axis and the Y-axis. In the case of FIG. 8(c), positions $Q_1$ through $Q_4$ and $Q'_1$ through $Q'_4$ are measured with the position of a reference to zero. The results of measurement are inserted in the following equations to obtain values $\Delta X$, $\Delta Y$, $R'$ and $\Delta R$:

$$\Delta X = \frac{(Q'_4 - Q_4) + (Q'_3 - Q_3)}{2}$$

$$\Delta y = \frac{(Q_1' - Q_1) + (Q_2' - Q_2)}{2}$$

$$R' = \frac{1}{2}\left(\frac{Q'_1 - Q'_2}{2} + \frac{Q'_4 - Q'_3}{2}\right)$$

$\Delta R = R' - R_0$ (Where $R_0$ is the specified radius) The program values are corrected by using these values $\Delta X$, $\Delta Y$ and $\Delta R$.

FIG. 8(d) is a diagram for a description of a method of measuring the reference surface of the table on which a workpiece is mounted. The measurement is carried out in the X-axis and the Y-axis. The origin is set with the measured values of a distance $R_1$ from the X-origin and a distance $R_2$ from the Y-origin. The offset of the origin is corrected by using the differences ($\Delta X = R'_1 - R_1$, and $\Delta Y = R'_2 - R_2$) from the origin set values.

FIG. 8(e) shows a workpiece measuring method. In the method, the measurement is carried out in the X-axis and the Y-axis. For instance in the case where a rectangular block is mounted on an X-Y planar table, the central x-coordinate and the central y-coordinate can be obtained from the following equations:

$$\text{central } x - \text{coordinate} = \frac{(T_2 - T_1) + (T_4 - T_3)}{2}$$

$$\text{central } y - \text{coordinate} = \frac{(T_5 - T_6) + (T_7 + T_8)}{2}$$

According to the results of calculations performed by using the errors obtained by these measurements, data in addresses are predetermined separately according to functions and uses such as (1) the tool presetting/correcting operation of the memory unit 3 in the case of the tool diameter/length measurement, (2) the program correcting operation of the memory unit 3 in the case of the machined configuration measurement, (3) the origin setting operation and the origin offset correcting operation in the case of the workpeice-mounting table reference surface measurement, (4) the workpiece centering operation in the case of the workpiece measurement, and (5) the workpiece inspection result in the case of the measurement, are rewritten. The resultant data are applied through the output interface 6 to the display unit 14. The data of paragraphs (1) through (4) are used as correcting values in machining the next workpiece in order to improve the machining precision of the workpiece, and are applied to the display unit 15 when necessary. The data of paragraph (5) is applied to the printer 15, so that an inspection result is prepared for the workpiece.

Figure 2:
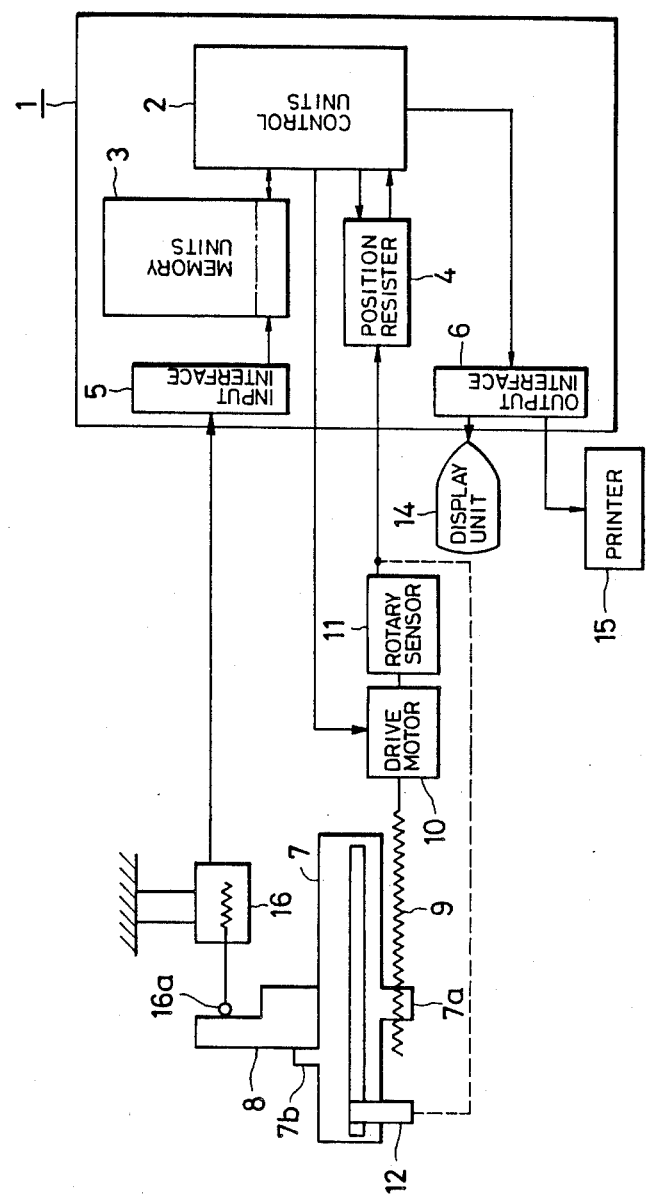
FIG. 2 is an explanatory diagram, partly as a block diagram, showing another example of the numerical control equipment according to the invention.

FIG. 2 shows another embodiment of the invention. The arrangement of the numerical control equipment shown in FIG. 2 is different from that of the numerical control equipment shown in FIG. 1 only in that instead of the analog measuring head 16 and the A/D converter 17 in FIG. 1, a measuring head 16 outputting binary digital values is employed. The numerical control equipment of FIG. 2 is the same both in function and in operation as that of FIG. 1. The measuring head may be one named "MINIAX" (Tokyo Seimitsu Kabushiki Kaisha (Co., Ltd.) Catalog No. 80C-10F).

While the preferred embodiments of the invention have been described with reference to the case where, in the vertical machining center, the table 7 is movable and the X-axis measuring head 16 is fixed at the predetermined position, the measuring head may be a movable one in the case where, in a CNC lathe system, a tool and measuring head are mounted on the X-axis and Z-axis movable members, or in the case where a three-dimensional measuring machine or a large machining center of column/cross/ram movement type is employed. Furthermore, in the tool measuring operation and in the tool presetting operation, the measuring head should be set at a predetermined position on the side of the spindle for a CNC lathe system, and should be set at a predetermined position on the table for a vertical machining center of X and Y axes movement type and for a large machining center of column/cross/ram movement type.

In the embodiment of the invention shown in FIG. 1, the A/D converter 17 may be built in the numerical control equipment body 1.

In the embodiments shown in FIGS. 1 and 2, the measurement is carried out only in the X-axis. However, the measurements in two axes of X-axis and Y-axis, X-axis and Z-axis, or Y-axis and Z-axis, or three axes of X-, Y- and Z-axis, can be carried out simultaneously by providing a plurality of processing means in the input interface 5. The measuring head may be a non-touch type measuring head such as a distance sensor utilizing electromagnetic induction as well as a contact type measuring head having a potentiometer in a dial indicator.

As was described above, according to the invention, when an object under measurement is positioned at the theoretical position, simultaneously the difference between the stop position of the object and the reference position is measured with the result of arithemetic operation of the measured position and the stop position as a measurement result, the contents of the addresses provided separately according to functions and uses in the memory unit are changed. Therefore, with the numerical control equipment of the invention, the positioning operation and the measuring operation can be achieved within the same period of time and the arithmetic operation can be carried out immediately, and, if necessary, the arithmetic operation can be accomplished during the movement to the next measuring point.

Therefore, in the numerical control equipment of the invention, unlike conventional one using the touch sensor, the extremely low speed feeding operation for measurement is eliminated. As a result, in the method of the invention, the measurement time per measuring point is shorter by at least one second than that in the conventional method using the touch sensor.

Furthermore, in the system employed by the numerical control equipment of the invention, unlike the conventional system in which the interruption signal is produced and stored during the movement, the present position and the error are read directly after the positioning operation. Therefore, the numerical control equipment of the invention is completely free from the dispersion in measurement error caused by the movement which is due to the time delay. That is, since the measurement error depends directly on the positioning accuracy and the measuring head accuracy, the use of a high accuracy positioning means and the high accuracy measuring head permits high-accuracy and high-speed measurements with errors of the order of 0.1 $\mu$m according to the invention.

What is claimed is:

1. A numerical control apparatus, comprising:
   a table for holding an object to be measured;
   drive means for driving said table;
   control means for providing movement instructions to said drive means in order to move said object on said table to a target position;
   position sensor means for detecting the position of said table;
   position register for receiving a detection signal from said position sensor means;
   measuring means for measuring the difference between a stop position of said object on said table and a reference position on said table, as said object on said table is moved to said target position; and
   memory means for storing the output of said measuring means as data;
   wherein said control means receives said output of said measuring means and an output of said position register, and controls said memory means to rewrite said data in said memory means as a measurement result.

2. An apparatus as claimed in claim 1, wherein said measurement result is applied to a display unit and a printer.

3. An apparatus as claimed in claim 1, further comprising an analog to digital converter for converting analog outputs of said measuring means to digital signals.

4. An apparatus as claimed in claim 1, wherein said measuring means output digital signals.

5. An apparatus as claimed in claim 3 or 4, further comprising an input interface having a writing instruction means and provided between said measuring means and said memory means, wherein said digital signals are written in said memory means by means of said writing instruction means at all times.

6. An apparatus as claimed in claim 1, wherein said measuring means is a contact type measuring head comprising a potentiometer provided in a dial indicator.

7. An apparatus as claimed in claim 1 wherein said measuring head is a non-touch type measuring head.

8. An apparatus as claimed in claim 7, wherein said measuring head is movable and said object is fixed at a predetermined position.

9. An apparatus as claimed in claim 1, wherein said measuring means is fixed at a predetermined position.

10. An apparatus as claimed in claim 1, wherein said measuring means is movable and said object is fixed at a predetermined position.

11. An apparatus as claimed in claim 5, wherein said memory is positioned between said control means and said input interface.

12. An apparatus as claimed in claim 1, wherein said measuring means measures a difference from a time when said measuring means falls into a detection stroke until a time when said object stops moving.

13. An apparatus as claimed in claim 12, wherein said measuring means comes into contact with said object in order to begin said detection stroke.

14. An apparatus as claimed in claim 1, wherein said control means outputs an interrupt signal, and said measuring means measures said difference when said interrupt signal ceases.

* * * * *